US008231976B2

(12) United States Patent
Sommer et al.

(10) Patent No.: US 8,231,976 B2
(45) **Date of Patent: *Jul. 31, 2012**

(54) BLOCK-RESISTANT, RADIATION-CURABLE COATING SYSTEMS BASED ON HIGH MOLECULAR MASS, AQUEOUS POLYURETHANE DISPERSIONS

(75) Inventors: Stefan Sommer, Leverkusen (DE); Jan Weikard, Odenthal-Erberich (DE); Erhard Luehmann, Bomlitz (DE)

(73) Assignee: Bayer MaterialScience AG, Leverkusen (DE)

( * ) Notice: Subject to any disclaimer, the term of this patent is extended or adjusted under 35 U.S.C. 154(b) by 518 days.

This patent is subject to a terminal disclaimer.

(21) Appl. No.: 12/429,398

(22) Filed: Apr. 24, 2009

(65) Prior Publication Data

US 2009/0269589 A1 Oct. 29, 2009

(30) Foreign Application Priority Data

Apr. 28, 2008 (DE) ........................ 10 2008 021 151

(51) Int. Cl.
*B32B 27/40* (2006.01)
*C08L 75/04* (2006.01)

(52) U.S. Cl. .................................... 428/425.1; 525/123

(58) Field of Classification Search ............... 428/423.1, 428/425.1; 525/123
See application file for complete search history.

(56) References Cited

U.S. PATENT DOCUMENTS 5,684,081 A 11/1997 Dannhorn et al.
6,207,744 B1 3/2001 Paulus et al.
6,521,702 B1 * 2/2003 Weikard et al. ............... 524/839

FOREIGN PATENT DOCUMENTS

| | | |
|---|---|---|
| CA | 2253119 | 5/1999 |
| DE | 3316592 | 11/1984 |
| DE | 4040290 | 7/1992 |
| EP | 872502 | 10/1998 |

OTHER PUBLICATIONS

Oldring, P.K.T., Chemistry & Technology of UV & EB Formulations for Coatings, Inks & Paints, vol. 2, 1991, SITA Technology, London, pp. 123-135.
Ullmanns Encyclopädie der technischen Chemie, 4th edition, vol. 19, Verlag Chemie, Weiheim, pp. 31-38.
Methoden der Organischen Chemie, Houben-Weyl, 4th edition, vol. E20, part 2, p. 1682, Georg Thieme Verlag, Stuttgart,1987.

* cited by examiner

*Primary Examiner* — Thao T. Tran
(74) *Attorney, Agent, or Firm* — Robert S. Klemz

(57) ABSTRACT

The present invention describes block-resistant, radiation-curable coating systems based on high molecular mass, aqueous polyurethane dispersions, a process for preparing them, the use of the coating systems as paints and/or adhesives, and also articles and substrates provided with these paints and/or adhesives.

15 Claims, No Drawings

BLOCK-RESISTANT, RADIATION-CURABLE COATING SYSTEMS BASED ON HIGH MOLECULAR MASS, AQUEOUS POLYURETHANE DISPERSIONS

CROSS-REFERENCE TO RELATED APPLICATIONS

The present application claims the right of priority under 35 U.S.C. §119(a)-(d) of German Patent Application Number 10 2008 021151 filed Apr. 28, 2008.

BACKGROUND OF THE INVENTION

The present invention describes block-resistant, radiation-curable coating systems based on high molecular mass, aqueous polyurethane dispersions, a process for preparing them, the use of the coating systems as paints and/or adhesives, and also articles and substrates provided with these paints and/or adhesives.

Radiation-curable, aqueous coating systems based on polyurethane polymers find application in the coating of substrates including wood, plastics and leather, and are distinguished by a multiplicity of positive properties, such as good chemical resistance and mechanical stability. A particular advantage is the ultra-rapid curing of the polyurethane top coat through crosslinking of the ethylenic double bonds present in the polymer, with the aid of high-energy radiation.

For many applications, as in the case of wood/furniture coating or the coating of plastics, for example, an important part is played by substantial initial physical drying after the water has evaporated but before radiation curing takes place. Substrates, which prior to radiation curing, have a film coating which is still tacky cannot be stacked, and even the slightest mechanical stresses, of the kind occurring in a paintshop in the course of transport, can leave marks and damage on the coating. Correspondingly, for the transport and storage of substrates which have been coated but not yet radiation-cured, the coater is required to operate at high levels of cost and complexity, possibly, to accept products which are outside specification.

Prior to radiation curing, systems known to date which exhibit good physical drying are nevertheless still very sensitive. The reason for this is that the high atmospheric humidity of the kind usual in paintshops which process water-based binders causes the films which have not been radiation-cured to start to swell and become soft. This leads in turn to the advantages of the block-resistant coatings, such as ease of handling and storage in stacks, being lost again.

It would be desirable to obtain coatings which are block-resistant after physical drying and whose water resistance is sufficient that they remain block-resistant even under high atmospheric humidity, or offer a certain degree of resistance in the event of incomplete radiation curing, for example, on articles of complex shape, such as chairs. The use of such coating systems will increase the efficiency of the painting operation and hence lower painting costs.

The requirements imposed on modern-day coating systems are highly diverse. Hence it is not only of advantage if radiation-curable coating systems are block-resistant after physical drying; instead, the film obtained after radiation curing ought to be distinguished by high chemical stabilities and good mechanical robustness.

EP-A 753 531 describes urethane acrylate dispersions based on hydroxyl-containing polyester acrylates and polyepoxy acrylates. Although the films described therein dry physically, their resistance to water prior to radiation curing is not good, and they also have weaknesses with respect to solvents after radiation curing. In the application, alcohols or amines having a functionality of three or more are not used to construct a high molecular mass polyurethane acrylate or to improve the block resistance in a deliberate way.

EP-A 942022 describes urethane acrylate dispersions based on hydroxyl-containing polyester, polyether or polyurethane acrylates in combination with polyepoxy acrylates. The coating systems described lead to physically drying clearcoat materials, but the water resistance prior to radiation curing is inadequate. Moreover, owing to aromatic constituents, the use of polyepoxy acrylates leads to poor weathering stability. The use of polyepoxy acrylates likewise leads to a brittle film after radiation curing, and hence to poor adhesion to plastics substrates.

Aqueous, radiation-curable polyurethane dispersions based on hydroxyl-containing polyester acrylates and polyether acrylates are found in EP-A 872 502. The coating systems lead to films which dry physically but exhibit poor block resistance. The solvent resistances are likewise inadequate. The use of alcohols or amines with a functionality of three or more for deliberately improving the block resistance is not described.

It was an object of the present invention to provide coating systems based on aqueous, radiation-curing polyurethane dispersions that after physical drying and before radiation curing provide coatings having good block resistance. These coatings, even without radiation curing, possess sufficient water resistance, so the block resistance is retained even in the event of heightened atmospheric humidity. Moreover, after radiation curing, the film coatings are mechanically robust and highly resistant to chemicals.

This object has been achieved through the use of amines and alcohols with a functionality of three or more for preparing the polyurethanes present in the dispersions.

SUMMARY OF THE INVENTION

The invention accordingly provides coating systems based on radiation-curing aqueous polyurethane dispersions comprising I) polyurethanes obtained from A) 40% to 80% by weight of a hydroxyl-containing component comprising A1) 10% to 80% by weight, based on the sum of components (A) to (F) and (II), of one or more hydroxyl-containing prepolymers selected from the group consisting of polyester (meth)acrylates or polyether (meth)acrylates having an OH number of from 5 to 300 mg KOH/g solids and comprising groups which, on exposure to high-energy radiation, undergo polymerization reaction with ethylenically unsaturated double bonds, A2) 0% to 50% by weight, based on the sum of components (A) to (F) and (II), of one or more monomeric alcohols containing (meth)acrylate groups and having an OH number of from 35 to 1000 mg KOH/g solids, B) 0.1% to 20% by weight, based on the sum of components (A) to (F) and (II), of one or more compounds which are reactive towards isocyanate groups and contain groups which are non-ionic, ionic or capable of forming ionic groups and have a dispersing action for the polyurethane dispersion, C) 0.1% to 30% by weight, based on the sum of components (A) to (F) and (II), of a hydroxyl- and/or amine-containing component comprising C1) 0.1% to 10% by weight, based on the sum of components (A) to (F) and (II), of hydroxyl- and/or amine-functional monomeric compounds having a functionality of 3 to 6 and a molecular weight of from 92 to 254 g/mol and/or C2) 0.1% to 20% by weight, based on the sum of components (A) to (F) and (II), of hydroxyl- and/or amine-functional polyesters, C2, C3 and/or C4 polyethers and polyetheresters having a functionality of 2.3 to 4.0 and a molecular weight of from 238 to 4000 g/mol, D) 0% to 30% by weight, based on the sum of components (A) to (F) and (II), of hydroxyl-functional compounds selected from the group of monoalcohols and/or diols, each with a molecular weight in the range from 32 to 118 g/mol, polyesters, polycarbonates, C2, C3, and/or C4 polyethers, polyetheresters and polycarbonate polyesters having a functionality of 1.0 to 2.0, in each case with a molecular weight of from 300 to 4000 g/mol, E) 0.1% to 10% by weight, based on the sum of components (A) to (F) and (II), of monoamines, diamines and/or difunctional amino alcohols, with F) 10% to 50% by weight, based on the sum of components (A) to (F) and (II), of one or more polyisocyanates, with the proviso that the use of polyepoxy (meth)acrylates in the synthesis of (I) is excluded, and II) 0% to 40% by weight of oligo(meth)acrylates selected from the group of component (A1) with a double bond density of more than 2.0 mol of double bonds/kg of solids and, on exposure to high-energy radiation, undergoing polymerization reaction with ethylenically unsaturated compounds, the fractions of components (A) to (F) and of component (II) adding up to 100% by weight, and the mixture of (I) and (II) that is present in the coating system having a weight-average molar mass MW of 50,000 to 3,000,000 g/mol.

The invention further provides a process for preparing the coating systems of the invention, comprising the following steps:

i) reacting components A) to D) with component F) to give polyurethane prepolymers, ii) admixing component II with the reaction product of step i), and iii) dispersing the mixture obtained after step ii) in water to give an aqueous polyurethane dispersion, the (potentially) ionic groups introduced, if appropriate, with component B) being at least partly neutralized before, during or after the admixing of component II, or before, during or after the dispersing, and the polyurethane prepolymers being reacted with component E at any point in time after step i) that is possible.

DETAILED DESCRIPTION OF THE PREFERRED EMBODIMENTS

The process of the invention is advantageous if components (A), (B), (C) and (D) are introduced into the reactor as an initial charge, diluted, if appropriate, with a solvent which is miscible with water but inert towards isocyanate groups, and heated to temperatures of 30 to 80° C., with isocyanate addition reaction catalysts being added, if appropriate, to the mixture of the compounds (A), (B), (C) and (D) before the reaction with the polyisocyanate(s) (F), the molar ratios of isocyanate-reactive groups in (A), (B), (C) and (D) to isocyanate groups (F) being in the range from 1:0.8 to 1:2.5, and the polyurethane obtainable according to step i) being dissolved with the oligo(meth)acrylates (II) in acetone, to give an oligo (meth)acrylate/acetone solution; with vigorous stirring, in accordance with step iii), either this solution is introduced into the dispersing water, containing the amine or amines (E), or, conversely, the dispersing water/amine mixture is added to the polyurethane oligo(meth)acrylate/acetone solution. If appropriate the acetone is distilled off subsequently.

The invention further provides radiation-curable coating systems which are block-resistant after physical drying, obtainable by the process of the invention.

The coating system obtainable by the process of the invention is advantageous if the degree of neutralization of the acids and/or bases introduced by component (B) is between 50% and 125% . A degree of neutralization above 100% means that in comparison to polymer-bound acid or base an excess of base or acid is used for neutralization, respectively.

The coating system obtainable by the process of the invention is advantageous if the reaction of the remaining free isocyanate groups of the prepolymer through component (E) takes place to an extent of 35% to 150%. Where a substoichiometric amount of amine (E) is used, remaining free isocyanate groups are consumed slowly by reaction with water. Where an excess of amine (E) is used, there are no longer any unreacted isocyanate groups present, and an amine-functional polyurethane is obtained.

The coating system obtainable by the process of the invention is advantageous if 0.1% to 10% by weight of hydroxy- and/or amine-functional compounds having a functionality of 3 to 6 and a molecular weight in the range from 92 to 254 g/mol and/or 0.1% to 20% by weight of hydroxy- and/or amine-functional polyesters, polycarbonates, C2, C3 and/or C4 polyethers, polyetheresters and polycarbonate polyesters having a functionality of 2.5 to 4.0 and a molecular weight in the range from 238 to 4000 g/mol is/are present.

The coating system obtainable by the process of the invention is advantageous if the mixture of (I) and (II) present therein has a weight-average molar mass MW of preferably 100 000 to 2 000 000 g/mol, more preferably 150 000 to 1 000 000 g/mol.

The coating system obtainable by the process of the invention is advantageous if the reaction of the polyurethane prepolymers with component (E) in acetonic solution is carried out before or after the addition of component (II).

The coating system obtainable by the process of the invention is advantageous if the aqueous polyurethane dispersion further comprises at least an initiator and, if appropriate, further auxiliaries and additives, allowing curing with high-energy radiation.

The coating system obtainable by the process of the invention is advantageous if the aqueous polyurethane dispersion contains less than 5% by weight of organic solvents.

The invention further provides for the use of the coating system obtainable by the process of the invention for producing adhesives and/or block-resistant clear varnishes or pigmented paints.

The invention further provides for the use of the coating system obtainable by the process of the invention for producing adhesives and/or block-resistant clear varnishes or pigmented paints.

The invention further provides block-resistant clear varnishes of pigmented paints which comprise a coating system obtainable by the process of the invention.

The invention further provides an adhesive which comprises a coating system obtainable by the process of the invention.

The invention further provides for the use of the hard clear varnish or pigmented paint which comprises a coating system obtainable by the process of the invention for producing a coated substrate.

The invention further provides for the use of the adhesive which comprises a coating system obtainable by the process of the invention to produce an article constructed from at least two or more materials.

The invention further provides a substrate comprising a block-resistant clear varnish or pigmented paint which comprises a coating system obtainable by the process of the invention.

The substrate comprising a block-resistant clear varnish or pigmented paint which comprises a coating system obtainable by the process of the invention is advantageous if the substrate is selected from the group consisting of wood, wood-based materials, furniture, wood block flooring, doors, window frames, metallic articles, plastics, paper, paperboard, cork, mineral substrates, textiles or leather.

The invention further provides an article comprising the adhesive which comprises a coating system obtainable by the process of the invention.

The article comprising the adhesive which comprises a coating system obtainable by the process of the invention is advantageous if the article is constructed from at least two like and/or different materials selected from the group consisting of wood, wood-based materials, furniture, wood block flooring, doors, window frames, metallic articles, plastics, paper, paperboard, cork or leather.

Component (A) comprises a component (A1) and optionally a component (A2).

Component (A1) comprises oligomers and polymers containing unsaturated groups. These oligomers and polymers containing unsaturated groups are selected from the group of polyester (meth)acrylates, polyether (meth)acrylates, polyetherester (meth)acrylates, unsaturated polyesters with allyl ether structural units, and combinations of the compounds stated.

Of the polyester (meth)acrylates, use is made as component (A1) of the hydroxyl-containing polyester (meth)acrylates having an OH number in the range from 15 to 300 mg KOH/g solids, preferably of 60 to 200 mg KOH/g solids. In the preparation of the hydroxyl-functional polyester (meth) acrylates (A1) it is possible for a total of 7 groups of monomer constituents to be employed:

The first group (a) comprises alkanediols or diols or mixtures of these. The alkanediols have a molecular weight in the range from 62 to 286 g/mol. The alkanediols are preferably selected from the group of ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol. Preferred diols are diols containing ether oxygen, such as diethylene glycol, triethylene glycol, tetraethylene glycol, dipropylene glycol, tripropylene glycol, polyethylene, polypropylene or polybutylene glycols having a molecular weight in the range of from 200 to 4000, preferably 300 to 2000, more preferably 450 to 1200 g/mol. Reaction products of the aforementioned diols with ϵ-caprolactone or other lactones may likewise be employed as diols.

The second group (b) comprises alcohols having a functionality of three or more and a molecular weight in the range from 92 to 254 g/mol, and/or polyethers prepared starting from these alcohols. Particularly preferred alcohols with a functionality of three or more are glycerol, trimethylolpropane, pentaerythritol, dipentaerythritol and sorbitol. One particularly preferred polyether is the reaction product of 1 mol of trimethylolpropane with 4 mol of ethylene oxide.

The third group (c) comprises monoalcohols. Particularly preferred monoalcohols are selected from the group of ethanol, 1- and 2-propanol, 1- and 2-butanol, 1-hexanol, 2-ethylhexanol, cyclohexanol and benzyl alcohol.

The fourth group (d) comprises dicarboxylic acids having a molecular weight in the range from 104 to 600 g/mol and/or their anhydrides. Preferred dicarboxylic acids and their anhydrides are selected from the group of phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimers of the fatty acids as listed in the sixth group (f).

The fifth group (e) comprises trimellitic acid or trimellitic anhydride.

The sixth group (f) comprises monocarboxylic acids selected from the group of benzoic acid, cyclohexanecarboxylic acid, 2-ethylhexanoic acid, caproic acid, caprylic acid, capric acid, lauric acid, and natural and synthetic fatty acids selected from the group of lauric, myristic, palmitic, margaric, stearic, behenic, cerotinic, palmitoleic, oleic, icosenic, linoleic, linolenic and arachidonic acid.

The seventh group (g) comprises acrylic acid, methacrylic acid and/or dimeric acrylic acid.

Suitable hydroxyl-containing polyester (meth)acrylates (A1) comprise the reaction product of at least one constituent from group (a) or (b) with at least one constituent from group (d) or (e) and at least one constituent from group (g).

Particularly preferred constituents from group (a) are selected from the group of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, selected from the group of diethylene glycol, triethylene glycol, tetraethylene glycol, dipropylene glycol and tripropylene glycol. Preferred constituents from group (b) are selected from the group of glycerol, trimethylolpropane, pentaerythritol or the reaction product of 1 mol of trimethylolpropane with 4 mol of ethylene oxide. Particularly preferred constituents from groups (d) and (e) are selected from the group of phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecanedioic acid, hydrogenated dimers of the fatty acids listed under the 6th group (f), and trimellitic anhydride. A preferred constituent from group (g) is acrylic acid.

If desired it is also possible to incorporate groups with a known dispersing action into these polyester (meth)acrylates. For instance, as an alcohol component, it is possible to make proportional use of polyethylene glycols and/or methoxypolyethylene glycols. As compounds it is possible to use polyethylene glycols, polypropylene glycols and their block copolymers, prepared starting from alcohols, and also the monomethyl ethers of these polyglycols. Particularly suitable is polyethylene glycol monomethyl ether with a molecular weight in the range of 500-1500 g/mol.

It is also possible after the esterification to react some of the remaining free, unesterified carboxyl groups, especially those of the (meth)acrylic acid, with mono-, di- or polyepoxides. Preferred epoxides are the glycidyl ethers of monomeric, oligomeric or polymeric bisphenol A, bisphenol F, hexanediol and/or butanediol or their ethoxylated and/or propoxylated derivatives. This reaction may be used in particular for increasing the OH number of the polyester (meth)acrylate, since the epoxide/acid reaction produces one OH group in each case. The acid number of the resulting product is between 0 and 20 mg KOH/g, preferably between 0 and 10 mg KOH/g and more preferably between 0 and 5 mg KOH/g solids. The reaction is preferably catalyzed by catalysts such as triphenylphosphine, thiodiglycol, ammonium halides and/or phosphonium halides and/or zirconium compounds or tin compounds such as tin(II) ethylhexanoate.

The preparation of polyester (meth)acrylates is described at page 3, line 25 to page 6 line 24 of DE-A 4 040 290, at page 5 line 14 to page 11 line 30 of DE-A 3 316 592 and pages 123 to 135 of P.K.T. Oldring (Ed.) in Chemistry & Technology of UV & EB Formulations For Coatings, Inks & Paints, Vol. 2, 1991, SITA Technology, London.

Likewise suitable as component (A1) are hydroxyl-containing polyether (meth)acrylates, which originate from the reaction of acrylic acid and/or methacrylic acid with polyethers. The polyethers are selected from the group of homopolymers, copolymers or block copolymers with ethylene oxide, propylene oxide and/or tetrahydrofuran on any desired hydroxy- and/or amine-functional starter molecules selected from the group of trimethylolpropane, ethylene glycol, propylene glycol, diethylene glycol, dipropylene glycol, glycerol, pentaerythritol, neopentyl glycol, butanediol and hexanediol.

As well as the unsaturated compounds, component (A1) preferably also has NCO-reactive compounds, more particularly hydroxyl groups. By these hydroxyl groups there is partial or complete incorporation into the polyurethane framework.

Preferred components (A1) are compounds selected from the group of polyester (meth)acrylates, polyether (meth)acrylates and polyetherester (meth)acrylates which have hydroxyl groups as well as the unsaturated groups.

Particularly preferred as component (A1) are hydroxyl-functional polyester (meth)acrylates and polyether (meth) acrylates.

In addition it is possible to use compounds of component (A1) alone or in combination with the following compounds (A2).

Component (A2) comprises one or more monomeric alcohols containing (meth)acrylate groups and having an OH number in the range of 35-1000 mg KOH/g, preferably having an OH number in the range from 130 to 966 mg KOH/g solids. Alcohols of this kind containing (meth)acrylate groups are selected from the group of 2-hydroxyethyl (meth) acrylate, caprolactone-extended modifications of 2-hydroxyethyl (meth)acrylate such as Pemcure® 12A (Cognis, DE), 2-hydroxypropyl (meth)acrylate, 4-hydroxybutyl (meth) acrylate, 3-hydroxy-2,2-dimethylpropyl (meth)acrylate, the in average mono-hydroxyfunctional di-, tri-, tetra- or penta-(meth)acrylates of polyhydric alcohols such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or their technical mixtures, the incorporation of (A2) into the adduct of components (A), (B), (C), (D) and (F) taking place via hydroxyl functions that are still free.

Moreover it is also possible as component (A2) to use alcohols obtainable from the reaction of acids containing double bonds with monomeric epoxide compounds optionally containing double bonds. Preferred reaction products are selected from the group of (meth)acrylic acid with glycidyl (meth)acrylate or with the glycidyl ester of tertiary, saturated monocarboxylic acid. The tertiary, saturated monocarboxylic acids come from the group of 2,2-dimethylbutyric acid, ethylmethylbutyric, ethylmethylpentanoic, ethylmethylhexanoic, ethylmethylheptanoic and ethylmethyloctanoic acid.

Very particularly preferred as component A2 are 2-hydroxyethyl (meth)acrylate, 2-hydroxypropyl (meth)acrylate, pentaerythritol triacrylate, dipentaerythritol pentaacrylate, and the adduct of glycidyl ethylmethylheptanoate with (meth)acrylic acid and their technical mixtures.

Component (B) comprises one or more compounds which are reactive towards isocyanate groups and have a dispersing action for the aqueous polyurethane dispersion. By compounds that are reactive towards isocyanate groups and have a dispersing action are meant acids, bases, ionic compounds and compounds containing ether groups. Preferred acids and bases have groups selected from the group of hydroxyl, amino and thiol groups, via which incorporation takes place into the reaction product of components (A), (C), (D) and (F), and whose isocyanate-reactive groups are subsequently converted into the corresponding groups with a dispersing action, selected from the group of sulfonium salts, ammonium salts, carboxylate salts and sulfonate salts. Particularly preferred acids, bases and ionic compounds are selected from the group of mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and their salts, such as dimethylolpropionic acid, dimethylolbutyric acid, hydroxypivalic acid, N-(2-aminoethyl)alanine, 2-(2-aminoethylamino)ethanesulfonic acid, ethylenediaminepropyl- or -butylsulfonic acid, 1,2- or 1,3-propylenediamineethylsulfonic acid, malic acid, citric acid, glycolic acid, lactic acid, glycine, alanine, taurine, lysine, 3,5-diaminobenzoic acid, an adduct of isophoronediamine (1-amino-3,3,5-trimethyl -5-aminomethylcyclohexane or IPDA) and acrylic acid (EP-A 916 647, example 1) and its alkali metal or ammonium salts, the adduct of sodium bisulfite with but-2-ene-1,4-diol, polyethersulfonate, the propoxylated adduct of 2-butenediol and $NaHSO_3$ as described in DE-A 2 446 440 at page 5-9, formula I-III, and also N-methyldiethanolamine, and compounds possessing carboxy or carboxylate and/or sulfonate groups and/or ammonium groups. Particularly preferred ionic compounds are those which comprise carboxyl and/or sulfonate groups as ionic groups, such as the salts of 2-(2-aminoethylamino)ethanesulfonic acid or of the adduct of isophoronediamine and acrylic acid (EP 916 647 A1, example 1) and also of dimethylolpropionic acid.

Preferred compounds containing ether groups are selected from the group of polyethylene glycols, polypropylene glycols and their block copolymers, prepared starting from alcohols, and also the monomethyl ethers of these polyglycols. Preference is given to polyethers of linear construction with a functionality of between 1 and 3, but also to compounds of the general formula (I), (I)

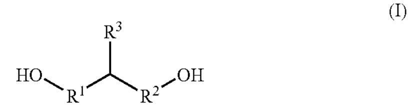

in which $R^1$ and $R^2$ independently of one another are each a divalent aliphatic, cycloaliphatic or aromatic radical having 1 to 18 C atoms, which may be interrupted by oxygen and/or nitrogen atoms, and $R^3$ is an alkoxy-terminated polyethylene oxide radical.

Preferred polyethers are selected from the group of monofunctional polyalkylene oxide polyether alcohols containing on average 5 to 70, preferably 7 to 55, ethylene oxide units per molecule, of the kind obtainable in conventional manner by alkoxylation of suitable starter molecules and described in Ullmanns Encyclopädie der technischen Chemie, 4th edition, volume 19, Verlag Chemie, Weinheim, pages 31-38.

Starter molecules preferred for this purpose are selected from the group of saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as diethylene glycol monomethyl ether, diethylene glycol monoethyl ether, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and also heterocyclic, secondary amines such as morpholine, pyrrolidine, piperidine and 1H-pyrazole. Particularly preferred starter molecules are selected from the group of saturated monoalcohols, diethylene glycol monomethyl, monoethyl and monobutyl ethers. Use is made with particular preference of diethylene glycol monomethyl, monoethyl or monobutyl ethers.

Alkylene oxides suitable for the alkoxylation reaction are ethylene oxide and propylene oxide, which in the alkoxylation reaction may be used in any order or else in a mixture.

The polyalkylene oxide polyether alcohols are either pure polyethylene oxide polyethers or mixed polyalkylene oxide polyethers at least 30 mol %, preferably at least 40 mol %, of whose alkylene oxide units consist of ethylene oxide units. Preferred non-ionic compounds are monofunctional mixed polyalkylene oxide polyethers which contain at least 40 mol % ethylene oxide units and not more than 60 mol % propylene oxide units.

The stated acids are converted into the corresponding salts by reaction with neutralizing agents, such as triethylamine, ethyidiisopropylamine, dimethylcyclohexylamine, dimethylethanolamine, ammonia, N-ethylmorpholine, LiOH, NaOH and/or KOH. The degree of neutralization in this instance is between 50% and 125%.

Component (C) comprises a component (C1) and/or a component (C2).

Component (C1) is preferably selected from the group of aliphatic or cycloaliphatic triols, tetrols and hexols and also triamines and tetraamines that contain 3 to 10 carbon atoms. Preferred triols are glycerol, trimethylolethane, trimethylolpropane and trimethylolbutane. Preferred tetrols are to be selected from the group of pentaerythritol and di-trimethylopropane. Preferred hexols are dipentaerythritol, sorbitol, and hexoses, such as glucose and fructose. Preferred triamines and tetraamines are diethylenetriamine and triethylenetetraamine.

Very particular preference is given to the triols glycerol and trimethylolpropane, to the tetrols ditrimethylolpropane and pentaerythritol, and to the hexol dipentaerythritol.

Component (C2) comprises hydroxyl- and/or amine-functional polyesters, C2, C3 and/or C4 polyethers and polyetheresters with a functionality of 2.3 to 4.0 and a molecular weight in the range from 238 to 4000 g/mol.

Preferred hydroxyl-functional polyester alcohols are those based on aliphatic, cycloaliphatic and/or aromatic mono-, di-, tri- and/or polycarboxylic acids with mono-, di-, tri- and/or polyols. Particularly preferred polyester alcohols are selected from the group of the reaction products of adipic acid, isophthalic acid and phthalic anhydride with trimethylolpropane, glycerol, pentaerythritol, hexanediol, butanediol, diethylene glycol, monoethylene glycol or neopentyl glycol or mixtures of the stated diols of molecular weight from 300 to 4000, preferably 300 to 2500.

Preferred hydroxyl-functional polyetherols are selected from the group of reaction products obtainable by polymerization of cyclic ethers or by reaction of alkylene oxides with a trifunctional to hexafunctional starter molecule as recited under (C1). Particular preference is given to polyethylene and/or polypropylene glycols with an average molecular weight of 238 to 4000 g/mol and also to polytetrahydrofurans with an average molecular weight in the range from 500 to 4000 g/mol, preferably from 800 to 3000 g/mol.

Component (D) comprises hydroxyl-functional compounds selected from the group of monoalcohols and/or diols, in each case with a molecular weight in the range from 32 to 118 g/mol, hydroxyl-functional polyesters, polycarbonates, polyurethanes, C2, C3 and/or C4 polyethers, polyetheresters, polycarbonate polyesters with a functionality of 1.0 to 2.0, in each case with a molecular weight in the range from 300 to 4000 g/mol.

Preferred diols of component (D) are selected from the group of aliphatic, araliphatic or cycloaliphatic monoalcohols and/or diols containing 2 to 20 carbon atoms. Monoalcohols are preferably selected from the group of methanol, ethanol, 1-propanol, 1-butanol, 1-pentanol, 1-hexanol, 2-propanol, 2-butanol and 2-ethylhexanol. Preferred diols are selected from the group of ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl -3-hydroxypropyl 2,2-dimethyl-3-hydroxypropionate. Particular preference is given to 1,4-butanediol, 1,4-cyclohexanedimethanol and 1,6-hexanediol.

Preferred oligomers and/or higher molecular weight diols or amino alcohols with a number-average molecular weight in the range from 300 to 4000 g/mol, preferably 500 to 2500 g/mol, such as hydroxyl-functional oligomers and/or polymers such as hydroxyl-functional polyesters, polycarbonates, polyurethanes, C2, C3 and/or C4 polyethers, polyether esters or polycarbonate polyesters, and have an average hydroxyl functionality of 1.0 to 2.0.

Preferred hydroxyl-functional polyester alcohols are those based on aliphatic, cycloaliphatic and/or aromatic dicarboxylic acids with diols and also lactone-based polyester alcohols. Particularly preferred polyester alcohols are selected from the group of the reaction products of adipic acid, isophthalic acid and phthalic anhydride with hexanediol, butanediol, diethylene glycol, monoethylene glycol or neopentyl glycol, or mixtures of the stated diols, of molecular weight from 500 to 4000, preferably 800 to 2500.

Preferred hydroxyl-functional polyetherols are selected from the group of reaction products obtainable by polymerization of cyclic ethers or by reaction of alkylene oxides with a starter molecule. Particular preference is given to polyethylene and/or polypropylene glycols with an average molecular weight of 500 to 4000 g/mol and also to polytetrahydrofurans with an average molecular weight in the range from 500 to 4000 g/mol, preferably from 800 to 3000 g/mol.

Preferred hydroxyl-functional polycarbonates are hydroxyl-terminated polycarbonates which through reaction of diols or else lactone-modified diols or else bisphenols selected from the group of bisphenol A, polycarbonates obtainable with phosgene or carbonic diesters such as diphenyl carbonate or dimethylcarbonate, polymeric carbonates of 1,6-hexanediol with an average molecular weight of in the range from 500 to 4000 g/mol, and carbonates as reaction products of 1,6-hexanediol with ϵ-caprolactone in a molar ratio in the range from 1 to 0.1. Particular preference is given to the aforementioned polycarbonate diols with an average molecular weight in the range from 800 to 3000 g/mol based on 1,6-hexanediol, and/or carbonates of reaction products of 1,6-hexanediol with ϵ-caprolactone in a molar ratio in the range from 1 to 0.33.

Preference is also given to using hydroxyl-functional polyamide alcohols as component (D).

Particularly preferred as component (D) are the hydroxyl-functional polyesters.

Component (F) are polyisocyanates selected from the group of aromatic, araliphatic, aliphatic or cycloaliphatic polyisocyanates or mixtures of such polyisocyanates (F). Preferred polyisocyanates are selected from the group of 1,3-cyclohexane diisocyanate, 1-methyl-2,4-diisocyanatocyclohexane, 1-methyl-2,6-diisocyanatocyclohexane, tetramethylene diisocyanate, 4,4'-diisocyanatodiphenylmethane, 2,4'-diisocyanatodiphenylmethane, 2,4-diisocyanatotoluene, 2,6-diisocyanatotoluene, α,α,α,'α,'-tetramethyl-m- or p-xylylene diisocyanate, 1,6-hexamethylene diisocyanate, 1-isocyanato-3,3,5-trimethyl-5-isocyanatomethylcyclohexane (Isophorone diisocyanate or IPDI), 4-isocyanatomethyl-1,8-octane-diisocyanate (triisocyanatononane) 4,4'-diisocyanato-dicyclohexylmethane and also mixtures thereof, where appropriate also with other isocyanates and/or homologs of higher functionality and/or oligomers with urethane, biuret, carbodiimide, isocyanurate, allophanate, iminooxadiazinedione and/or uretdione groups.

The polyisocyanate component (F) preferably contains at least 60% by weight of cycloaliphatic and/or aliphatic isocyanates with a functionality of at least two.

With particular preference the polyisocyanate component (F) comprises 1-isocyanato -3,3,5-trimethyl-5-isocyanatomethylcyclohexane (Isophorone diisocyanate or IPDI), 1-methyl-2,4/(2,6)-diisocyanatocyclohexane, 4,4'-diisocyanatodicyclohexylmethane and/or 1,6-hexamethylene diisocyanate and/or homologs of higher functionality and/or oligomers with urethane, biuret, carbodiimide, isocyanurate, allophanate, iminooxadiazinedione and/or uretdione groups.

The fraction of cycloaliphatic polyisocyanates, such as 1-isocyanato-3,3,5-trimethyl -5-isocyanatomethylcyclohexane (Isophorone diisocyanate or IPDI), 1-methyl-2,4/(2,6)-diisocyanatocyclohexane and/or 4,4'-diisocyanatodicyclohexylmethane, based on all of the polyisocyanates used in the polyurethane dispersion, is preferably 50% to 100% by weight, more preferably 70% to 100% by weight.

Excluded from use for preparing the polyurethane (I) are hydroxyl-containing epoxy (meth)acrylates, such as the reaction products of diglycidyl ethers with α,β-ethylenically unsaturated monocarboxylic and/or dicarboxylic acids and their anhydrides, such as acrylic acid, methacrylic acid, fumaric acid, maleic acid, maleic anhydride, crotonic acid, itaconic acid, etc., as described in EP-0942022 A, for example. Preferentially excluded are the reaction products of diglycidyl ethers with acrylic acid and/or methacrylic acid.

Suitable oligo(meth)acrylates (II) are the compounds of component (A1) which have a double bond density of greater than 2.0 mol double bonds/kg solids, preferably greater than 3.0 mol double bond/kg solids. Particular preference is given to oligo(meth)acrylates (II) having a double bond density of greater than 5.0 mol double bonds/kg solids.

The oligomethacrylates (II) have a preferred OH number range from 5 to 150 mg, more preferably 15 to 100 mg, very preferably 15 to 60 mg KOH/g solids.

Component (II) is preferably selected from the group of (meth)acrylates of tetrols and hexols, such as (meth)acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol and/or the technical mixtures that are obtained in the (meth) acrylization of the aforementioned compounds. The oligo (meth)acrylates (II) may also be used in mixtures.

To raise the molar mass, monoamines and diamines and/or monofunctional or difunctional amino alcohols are used as component (E). Preferred diamines are those which in relation to the isocyanate groups are more reactive than water, since the extension of the polyesterurethane (meth)acrylate takes place optionally in an aqueous medium. Particularly preferred are the diamines selected from the group of ethylenediamine, 1,6-hexamethylenediamine, isophoronediamine, 1,3-, 1,4-phenylenediamine, 4,4'-diphenylmethanediamine, amino-functional polyethylene oxides, amino-functional polypropylene oxides (known under the name Jeffamin®, D series [Huntsman Corp. Europe, Zavantem, Belgium]) and hydrazine. Ethylenediamine is especially preferred.

Preferred monoamines are selected from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

To prepare the dispersions of the invention it is possible to use all of the methods known from the prior art, such as emulsifier/shearing force, acetone, prepolymer mixing, melt emulsification, ketimine, and solids/spontaneous dispersing methods or derivatives thereof. A compilation of these methods is found in Methoden der Organischen Chemie, Houben-Weyl, 4th edition, volume E20/part 2 on page 1682, Georg Thieme Verlag, Stuttgart, 1987. Preference is given to the melt emulsification method and the acetone method. The acetone method is particularly preferred.

To prepare the reaction product according to step i) components (A), (B), (C) and (D) are charged to the reactor and diluted with acetone if appropriate. To accelerate the addition reaction with isocyanate, isocyanate addition reaction catalysts selected from the group of triethylamine, 1,4-diazabicyclo-[2,2,2]octane, tin dioctoate or dubutyltin dilaurate are added, and the mixture is heated in order to allow onset of the reaction. In general this necessitates temperatures of 30 to 60° C. Subsequently the polyisocyanate or polyisocyanates (F) is or are added dropwise. The reverse variant is also possible, in which the polyisocyanates (F) are introduced as an initial charge and the isocyanate-reactive components (A), (B), (C) and (D) are added.

To monitor the reaction, the NCO content is determined at regular intervals by titration, infrared spectroscopy or near-infrared spectroscopy.

The molar ratios of isocyanate-reactive groups in (A), (B), (C) and (D) to isocyanate groups in (F) are from 1:0.8 to 1:2.5, preferably 1:1.2 to 1:1.5.

The preparation of products according to step i) of the process of the invention from components (A), (B), (C), (D) and (F) is followed, if it has not already been carried out in the starting molecules, by salt formation of the ionically dispersing centres of the compounds (B). Where component (B) contains acidic groups, it is preferred to use bases selected from the group of triethylamine, ethyldiisopropylamine, dimethylcyclohexylamine, dimethylethanolamine, ammonia, N-ethylmorpholine, LiOH, NaOH and/or KOH. Where component (B) contains basic groups, it is preferred to use acids selected from the group of lactic acid, acetic acid, phosphoric acid, hydrochloric acid and/or sulphuric acid. Where only compounds containing ether groups are used as component (B), this neutralization step is omitted.

Following step i), an oligo(meth)acrylate (II) or a mixture of oligo(meth)acrylates (II) is added. As soon as these compounds have dissolved, the last reaction step ensues, in which, in an aqueous medium, the molar mass increase and the formation of the polyester (meth)acrylate urethane dispersions that are needed for the coating system of the invention take place: The polyurethane, synthesized according to step i) from components (A), (B), (C), (D) and (F), and the oligo (meth)acrylate or oligo(meth)acrylates (II) in solution in acetone, are introduced with vigorous stirring into the dispersing water containing the amine or amines (E); or, conversely, the dispersing water/amine mixture is stirred into the polyurethane-oligo(meth)acrylate-acetone solution. Moreover, the dispersions present in the coating system of the invention are formed. The amount of amine (E) employed depends on the unreacted isocyanate groups still present. The reaction of the remaining free isocyanate groups with the amine (E) may take place to an extent from 35% to 150%. Where a deficit amount of amine (E) is used, remaining free isocyanate groups are consumed slowly by reaction with water. Where an excess amount of amine (E) is used, there are still unreacted isocyanate groups present, and an amine-functional polyurethane is obtained. Preferably 80% to 110%, more preferably 90% to 100%, of the remaining free isocyanate groups are reacted with the amine (E).

The reaction of components (A) to (D) with (F) at the end of step i) is preferably slowed by cooling of the reaction mixture, before component (II) is introduced with stirring at a reduced temperature, i.e. preferably at 30-40° C. (step ii)).

The coating system obtainable by the process of the invention is advantageous if the difference between the NCO content at the end of step i) and the theoretically attainable NCO content is +2.0% to −1.0% by weight, preferably 0% to −0.7% by weight, more preferably −0.1% to −0.5% by weight. Negative differences here mean that the NCO content at the end of step i) is below the theoretical NCO content.

In a further variant it is possible to carry out the molecular mass increase through the amine (E) while the system is still in acetonic solution, before or after the addition of the oligo (meth)acrylates (II).

If desired, the organic solvent—if present—can be removed by distillation. The dispersions then have a solids content of 20% to 60% by weight, more particularly 30% to 58% by weight.

It is likewise possible to carry out dispersing step and distillation step in parallel, in other words simultaneously.

As a result of the addition of the oligo(meth)acrylates (II) immediately prior to the dispersing step, component (II) is co-dispersed with the polyurethane that is synthesized from components (A), (B), (C), (D) and (F). The incorporation of the oligo(meth)acrylates (II), which may contain hydroxyl groups, into the polyurethane framework is unwanted and is prevented as a result of the addition shortly before the dispersing step.

Following the evaporation of the water, the dispersions of the invention produce clear films. As a result of subsequent radiation-induced and/or free-radically induced crosslinking, the films cure to form particularly high-value, scratch-resistant and chemical-resistant film coatings.

A suitable source for the radiation-induced polymerization is electromagnetic radiation, whose energy, where appropriate with addition of suitable photoinitiators, is sufficient to bring about free-radical polymerization of (meth)acrylate double bonds.

The radiation-induced polymerization preferably takes place by means of radiation with a wavelength of less than 400 nm, such as UV, electron, X-ray or gamma radiation. Particular preference is given to UV radiation, where curing is initiated with UV radiation in the presence of photoinitiators. With regard to the photoinitiators, a distinction is made in principle between two types, the unimolecular type (type I) and the bimolecular type (type II). Suitable type I systems are aromatic ketone compounds selected from the group of benzophenones in combination with tertiary amines, alkylbenzophenones, 4,4'-bis(dimethylamino)benzophenone (Michler's ketone), anthrone and halogenated benzophenones, or mixtures of the types stated. Further suitable are type II initiators such as benzoin and its derivatives, benzyl ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Preference is given to photoinitiators which are easy to incorporate into aqueous coating materials. Examples of such products are Irgacure® 500 (a mixture of benzophenone and (1-hydroxycyclohexyl)phenyl ketone, Ciba, Lampertheim, DE), Irgacure® 819 DW (phenylbis(2,4,6-trimethylbenzoyl) phosphine oxide, Ciba, Lampertheim, DE), Esacure® KIP EM (oligo[2-hydroxy-2-methyl-1-[4-(1-methylvinyl)phenyl]propanone], Lamberti, Aldizzate, Italy). Mixtures of these compounds can also be used.

For incorporating the photoinitiators it is also possible to use polar solvents selected from the group of acetone and isopropanol.

If appropriate the UV curing is conducted advantageously at 30-70° C., since higher temperatures tend to increase the degree of reaction of (meth)acrylate groups. This may result in better resistance properties. In the case of UV curing, however, account must also be taken of a possible temperature sensitivity on the part of the substrate, and so optimum curing conditions for a particular coating material/substrate combination must be determined by the skilled person in simple preliminary tests.

Curing takes place if desired under an inert gas atmosphere, i.e. with exclusion of oxygen, in order to prevent oxygen inhibition of the free-radical crosslinking.

Where curing is by thermal free-radical means, suitability is possessed by water-soluble peroxides or aqueous emulsions of water-insoluble initiators. These free-radical initiators may be combined in a known way with accelerators.

The coating systems of the invention can be applied by the conventional techniques to any of a very wide variety of substrates, preferably by spraying, rolling, flow coating, printing, knife coating, pouring, spreading and dipping.

With the coating systems of the invention it is possible in principle to paint or coat all substrates. Preferred substrates are selected from the group consisting of mineral substrates, wood, wood-based materials, furniture, wood-block flooring, doors, window frames, metallic articles, plastics, paper, paperboard, cork, mineral substrates, textiles or leather. In these contexts they are suitable as a primer and/or as a topcoat. In addition the coating systems of the invention may also be used in or as adhesives, such as in contact adhesives, in thermoactivable adhesives or in laminating adhesives, for example.

The coating systems of the invention may be used both alone and in binder mixtures with other dispersions. These may be dispersions which likewise contain unsaturated groups selected from the group of unsaturated dispersions that contain polymerizable groups and are based on polyester, polyurethane, polyepoxy (meth)acrylate, polyether, polyamide, polysiloxane, polycarbonate, epoxy acrylate, addition-polymer, polyester acrylate, polyurethane polyacrylate and/or polyacrylate.

It is also possible for dispersions of this kind based on polyesters, polyurethanes, polyethers, polyamides, polyvinyl esters, polyvinyl ethers, polysiloxanes, polycarbonates, addition polymers and/or polyacrylates to be present in the coating systems of the invention that contain functional groups, such as alkoxysilane groups, hydroxyl groups and/or isocyanate groups present if appropriate in a blocked form. In this way it is possible to produce dual-cure systems, which can be cured via two different mechanisms.

Likewise for dual-cure systems it is additionally possible to add what are called crosslinkers to the coating system of the invention. Those suitable include, preferably, non-blocked and/or blocked polyisocyanates, polyaziridines, polycarbodiimides and also melamine resin. Particularly preferred are non-blocked and/or blocked, hydrophilicized polyisocyanates for aqueous coating materials. It is preferred to add ≦20% by weight, more preferably ≦10% by weight, of solid crosslinker, relative to the solids content of the coating material.

It is also possible for the coating systems of the invention to comprise dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides, addition polymers, polyacrylates, polyurethane-polyacrylate, polyester acrylate, polyether acrylate, alkyd, polycarbonate, polyepoxy, epoxy(meth)acrylate that contain no functional groups. In this way it is possible to reduce the degree of the crosslinking density, which influences—accelerates, for example—physical drying, or to perform elastification or else a modification of adhesion.

Coating materials which comprise the coating systems of the invention may also have amino crosslinker resins, based on melamine or urea, and/or polyisocyanates with free or with blocked polyisocyanate groups, based on polyisocyanates optionally containing hydrophilicizing groups and formed from hexamethylene diisocyanate, isophorone diisocyanate and/or tolylidene diisocyanate, with urethane, uretdione, iminoxadiazinedione, isocyanurate, biuret and/or allophanate structures, added to them in the coating systems of the invention. Also possible as further crosslinkers are carbodiimides or polyaziridines.

The coating systems of the invention can be admixed and/or combined with the conventional paint-technology binders, auxiliaries and additives, selected from the group of pigments, dyes or matting agents. These are flow control additives and wetting additives, slip additives, pigments, including metallic effect pigments, fillers, nanoparticles, light stabilizing particles, anti-yellowing additives, thickeners, and additives for reducing the surface tension.

The coating systems of the invention are especially suitable for wood and plastic applications with a pigment content ≧10% by weight, based on the formulation as a whole. If high levels of pigment result in incomplete reaction of the radiation-curable groups in the coating system in the course of radiation curing, the resulting coatings are resistant to blocking.

The coating systems of the invention are likewise especially suitable for wood and plastic applications on highly stressed everyday articles, such as mobile phone casings, for example, where important factors are low scratchability and high resistance to chemicals, such as suncream, for example.

The coating system of the invention are likewise especially suitable for foil applications where between physical drying and radiation curing a deformation of the coated foil is taking place.

EXAMPLES

The measurement of the gel permeation chromatograms was made on the following system:

| | |
|---|---|
| Pump | Hewlett Packard 1100 series II |
| Injector | Hewlett Packard 1100 series II |
| Column oven | VDS-Optilab Jetstream 2 Plus |
| Detector | Refractive index detector, Hewlett Packard 1100 series II |

Conditions:

| | |
|---|---|
| Columns | 1. PSS HEMA 40; 50 × 7.8 mm<br>2. PSS HEMA 1000; 300 × 7.8 mm<br>3. PSS HEMA 300; 300 × 7.8 mm<br>4. PSS HEMA 40; 300 × 7.8 mm<br>5. PSS HEMA 40; 300 × 7.8 mm |
| Mobile Phase | N,N-dimethylacetamide |
| Flow rate | 0.6 ml/min |
| Pressure | 100 bar |

| | |
|---|---|
| Temperature | 30° C. |
| Injection volume | 100 μl |
| Sample concentration | 13.4 g/l |
| Standard for molecular weight | PSS Polymer-Standard-Service GmbH, Mainz, DE |
| MP [g/mol] | 162; 374; 1620; 9130; 18 100; 32 500; 67 500; 128 000; 246 000; 659 000; 1 000 000 |

The NCO content was monitored by titrimetry in each case in accordance with DIN 53185.

The solids content was determined by gravimetry after all of the non-volatile constituents have been evaporated off, in accordance with DIN 53216.

The average particle size was determined by laser correlation spectroscopy.

The pendulum hardness was measured according to DIN 53157.

1) Preparation of an Inventive, UV-Curable, Aqueous Polyurethane Dispersion for Use as a Binder for Block-Resistant Coating Materials 339.9 parts of the polyester acrylate Laromer® PE 44 F (OH number of 80 mg/KOH/g solids, BASF AG, Ludwigshafen, DE), component (A), 30.3 parts of dimethylolpropionic acid, component (B), 10.7 parts of trimethylolpropane, component (C), 199.7 parts of 4,4'-diisocyanatodicyclohexylmethane, component (F), and 0.6 part of dibutyltin dilaurate were dissolved in 185 parts of acetone and reacted with stirring at 60° C. to an NCO content of 1.90% by weight (theory: 1.72% by weight). The resulting prepolymer solution was admixed with 143.7 parts of the dipentaerythritol pentaacrylate Photomer® 4399 (Cognis AG, Düsseldorf, DE), component (II), and this component was stirred in. This was followed by neutralization, by the addition and stirring-in of 21.0 parts of triethylamine. The clear solution was introduced with stirring into 1080 parts of water. Then a mixture of 10.2 parts of ethylenediamine, component (E), and 24.0 parts of water was added to the dispersion with stirring. Subsequently the acetone was removed from the dispersion by distillation under a slight vacuum. This gave an inventive, UV-curable, aqueous polyurethane dispersion 1) having a solids content of 40.1% by weight, an average particle size of 69 nm and a pH of 8.5. The gel permeation chromatogram showed a weight-average molar mass Mw of $7.52*10^5$ g/mol.

2) Preparation of a Trifunctional Polyester 244.6 parts of trimethylolpropane, 638.1 parts of tetrahydrophthalic acid and 442.9 parts of neopentyl glycol were heated together with stirring at 220° C. This temperature was maintained until an acid number of less than 3.0 mg KOH/g solids had been reached. This gave a polyester having a functionality of 3.0 and a hydroxyl number of 250 mg KOH/g solids.

3) Preparation of an Inventive, UV-Curable, Aqueous Polyurethane Dispersion for Use as a Binder for Block-Resistant Coating Materials 339.9 parts of the polyester acrylate Laromer® PE 44 F (OH number of 80 mg/KOH/g solids, BASF AG, Ludwigshafen, DE), component (A), 40.0 parts of dimethylolpropionic acid, component (B), 42.2 parts of the trifunctional polyester from example 2), component (C), 199.7 parts of 4,4'-diisocyanatodicyclohexylmethane, component (F), and 0.6 part of dibutyltin dilaurate were dissolved in 195 parts of acetone and reacted with stirring at 60° C. to an NCO content of 1.44% by weight (theory: 1.62% by weight). The resulting prepolymer solution was admixed with 115.0 parts of the ethoxylated pentaerythritol tetraacrylate Miramer® 4004 (Rahn A G, Zurich, C H), component (II), and this component was stirred in. This was followed by neutralization, by the addition and stirring-in of 23.6 parts of triethylamine. The clear solution was introduced with stirring into 1085 parts of water. Then a mixture of 8.0 parts of ethylenediamine, component (E), and 24.0 parts of water was added to the dispersion with stirring. Subsequently the acetone was removed from the dispersion by distillation under a slight vacuum. This gave an inventive, UV-curable, aqueous polyurethane dispersion 3) having a solids content of 38.3% by weight, an average particle size of 34 nm and a pH of 8.7. The gel permeation chromatogram showed a weight-average molar mass Mw of $6.04*10^5$ g/mol.

4) Preparation of an Inventive, UV-Curable, Aqueous Polyurethane Dispersion for Use as a Binder for Block-Resistant Coating Materials 425.6 parts of the polyester acrylate Laromer® PE 44 F (OH number of 80 mg/KOH/g solids, BASF AG, Ludwigshafen, DE), component (A), 34.0 parts of dimethylolpropionic acid, component (B), 3.1 parts of diethylene triamine, component (C), 4.8 parts of neopentyl glycol, component (D), 199.7 parts of 4,4'-diisocyanatodicyclohexylmethane, component (F), and 0.6 part of dibutyltin dilaurate were dissolved in 210 parts of acetone and reacted with stirring at 60° C. to an NCO content of 0.92% by weight (theory: 1.07% by weight). The resulting prepolymer solution was admixed with 118.5 parts of the ethoxylated pentaerythritoltetraacrylate Miramer® 4004 (Rahn A G, Zurich C H), component (II), and this component was stirred in. This was followed by neutralization, by the addition and stirring-in of 23.6 parts of triethylamine. The clear solution was introduced with stirring into 1155 parts of water. Then a mixture of 5.3 parts of ethylenediamine, component (E), and 24.0 parts of water was added to the dispersion with stirring. Subsequently the acetone was removed from the dispersion by distillation under a slight vacuum. This gave an inventive, UV-curable, aqueous polyurethane dispersion 4) having a solids content of 43.8% by weight, an average particle size of 55 nm and a pH of 8.6. The gel permeation chromatogram showed a weight-average molar mass Mw of $7.51 *10^5$ g/mol.

5) Preparation of an Inventive, UV-Curable, Aqueous Polyurethane Dispersion for Use as a Binder for Block-Resistant Coating Materials 339.9 parts of the polyester acrylate Laromer® PE 44 F (OH number of 80 mg/KOH/g solids, BASF AG, Ludwigshafen, DE), component (A), 34.0 parts of dimethylolpropionic acid, component (B), 8.2 parts of trimethylol propane, component (C), 199.7 parts of 4,4'-diisocyanatodicyclohexylmethane, component (F), and 0.6 part of dibutyltin dilaurate were dissolved in 180 parts of acetone and reacted with stirring at 60° C. to an NCO content of 1.80% by weight (theory: 1.72% by weight). This was followed by neutralization, by the addition and stirring-in of 23.6 parts of triethylamine. The clear solution was introduced with stirring into 970 parts of water. Then a mixture of 8.0 parts of ethylenediamine, component (E), and 24.0 parts of water was added to the dispersion with stirring. Subsequently the acetone was removed from the dispersion by distillation under a slight vacuum. This gave an inventive, UV-curable, aqueous polyurethane dispersion 5) having a solids content of 40.2% by weight, an average particle size of 31 nm and a pH of 8.4. The gel permeation chromatogram showed a weight-average molar mass Mw of $3.54*10^5$ g/mol.

6) Preparation of the Polyester Acrylate A1) as Per Example 1 in EP-B 872 502

224.9 parts of hexane-1,6-diol, 96.6 parts of trimethylolpropane, 146.0 parts of adipic acid, 144.3 parts of acrylic acid, 3.1 parts of p-toluenesulfonic acid, 1.7 parts of hydroquinone monomethyl ether, 0.6 part of 2,6-di-tert-butylcresol and 250 of n-heptane were reacted at 96° C. for 10 hours with stirring, boiling at reflux and separation of water. Subsequently the solvent was removed by distillation. The OH number was 165 mg KOH/g, the acid number 1.0 mg KOH/g and the dynamic viscosity 520 mPas, measured according to DIN 53018 at 23° C.

7) Preparation of the Adduct f1) as Per Example 1 in EP-B 872 502

A reaction vessel equipped with stirrer, thermometer, dropping funnel, reflux condenser and regulatable heating system was charged with 55.0 parts of 2-hydroxyethyl acrylate and 0.06 part of dibutyltin oxide. While air was passed intensively through the reaction mixture, the latter was heated to 110° C., and 45.94 parts of ϵ-caprolactone were metered in via the dropping funnel over the course of 1 hour. The mixture was heated at 110° C. for 3 hours more, with stirring, until a viscosity in the range of 66-70 sec at 23° C. (DIN EN ISO 2431) was reached.

8) Preparation of an Aqueous, UV-Curable Polyurethane Dispersion as Per Example 1 in EP-B 872 502

Added dropwise to a mixture of 200 parts of the polyester acrylate 6), 68.4 parts of the adduct 7), 36.0 parts of dimethylolpropionic acid and 23.9 parts of triethylamine, over the course of 3 hours, were 214.0 parts of 1-isocyanato -3,3,5-trimethyl-5-isocyanatomethylcyclohexane, with stirring, at temperatures of 55 to 70° C. During the subsequent reaction at a temperature of 75 to 80° C., the NCO content dropped to the constant value of 2.2% by weight. Subsequently the resulting prepolymer was dispersed with vigorous stirring in 749.4 parts of water at a temperature of 38 to 42° C. Thereafter the dispersion obtained was admixed dropwise with a mixture of 9.6 parts of ethylenediamine and 14.3 parts of water at the same temperature over the course of 15 minutes. After that, stirring was continued until isocyanate was no longer detectable by IR spectroscopy at 2270 cm-1. This gave a UV-curable, aqueous polyurethane dispersion 8) as per example 1 in EP-B 872 502, having a solids content of 40% by weight, an average particle size of 99 nm and a pH of 7.6. The gel permeation chromatogram showed a weight-average molar mass Mw of $3.45*10^4$ g/mol.

9) Preparation of an Aqueous, UV-Curable Polyurethane Dispersion as Per Example 5 in EP-B 942 022

41.3 parts of the adipic acid-based polyester acrylate AgiSyn® 720 (OH number of 116 mg/KOH/g solids, AGI Co., Taipei, Taiwan), 90.1 parts of the polyepoxy acrylate AgiSyn® 1010 (OH number of 240 mg/KOH/g solids, AGI Co., Taipei, Taiwan), 17.1 parts of dimethylolpropionic acid, 33.6 parts of hexamethylene diisocyanate, 44.4 parts of 1-isocyanato -3,3,5-trimethyl-5-isocyanatomethylcyclohexane and 0.24 part of dibutyltin dilaurate were dissolved in 131 parts of acetone and reacted at 60° C. with stirring until the NCO content was 1.60% by weight (theory: 1.25% by weight). This was followed by neutralization, by the addition and stirring-in of 12.7 parts of triethylamine. The clear solution was introduced with stirring into 500 parts of water. Thereafter a mixture of 3.6 parts of ethylenediamine and 30.0 parts of water was added to the dispersion with stirring. Subsequently the acetone was removed from the dispersion by distillation under a slight vacuum. This gave a UV-curable, aqueous polyurethane dispersion 9) as per example 5 in EP-B 942 022, having a solids content of 32.8% by weight, an average particle size of 90 nm and a pH of 8.4. The gel permeation chromatogram showed a weight-average molar mass Mw of $9.03*10^4$g/Mol.

10) Preparation of an Aqueous, UV-Curable Polyurethane Dispersion as Per Example 2 in EP-B 753 531

150.2 parts of the polyester acrylate Laromer® 8800 (OH number of 70 mg/KOH/g solids, BASF AG, Ludwigshafen, DE), 15.0 parts of dimethylolpropionic acid, 24.0 parts of hexamethylene diisocyanate, 31.7 parts of 1-isocyanato-3,3,5-trimethyl-5-isocyanatomethylcyclohexane and 0.22 part of dibutyltin dilaurate were dissolved in 129 parts of acetone and reacted at 60° C. with stirring until the NCO content was 2.20% by weight (theory: 1.92% by weight). This was followed by neutralization, by the addition and stirring-in of 11.2 parts of triethylamine. The clear solution was introduced with stirring into 515 parts of water. Thereafter a mixture of 3.6 parts of ethylenediamine and 30.0 parts of water was added to the dispersion with stirring. Subsequently the acetone was removed from the dispersion by distillation under a slight vacuum. This gave a UV-curable, aqueous polyurethane dispersion 10) as per example 2 in EP-B 735 531, having a solids content of 29.0% by weight, an average particle size of 180 nm and a pH of 7.7. The gel permeation chromatogram showed a weight-average molar mass Mw of $8.40*10^4$ g/mol.

Performance Tests

TABLE 1

| Formulations | |
|---|---|
| | Clear varnishes [1], [2] and [3] [parts by weight] |
| UV dispersion (adjusted to 40% solids) | 98.0 |
| Wetting agent BYK ® 348[1] | 1.0 |
| Irgacure ® 500[2] | 1.0 |
| Total | 100.0 |

[1] Solution of a polyether-modified polydimethylsiloxane from BYK, Wesel, DE

[2] A mixture of 50% by weight 1-hydroxycyclohexyl phenyl ketone and 50% by weight benzophenone from Ciba, Lampertheim, DE

TABLE 2

| Conditions of application and curing | | | |
|---|---|---|---|
| | Varnish [1] | Varnish [2] | Varnish [3] |
| Substrate | Glass | Bayfol[3] | Makrofol[4] |
| Application by knife coating | Box-type doctor, 1 × 120 µm, wet film | Wire doctor, 1 × 100 µm, wet film | Wire doctor, 1 × 100 µm, wet film |
| Deaerating time | 10 min, RT and 30 min, 50° C. | 10 min, RT and 30 min, 50° C. | 10 min, RT and 30 min, 50° C. |
| Curing | Hg[5] | Hg[5] | Hg[5] |

[3] Technical film consisting of polycarbonate blends and ABS from Bayer MaterialScience AG, Leverkusen, DE

[4] Technical film consisting of polycarbonate from Bayer MaterialScience AG, Leverkusen, DE

[5] UV system from Cefla, I (about 80 W/cm, about 1000 mJ/cm²)

After UV curing, the coated substrates are stored at room temperature for 16 h and then subjected to the tests.

TABLE 3

Performance testing data

| Performance test | Example 1 | Example 3 | Example 4 | Example 5 |
|---|---|---|---|---|
| Pendulum hardness before UV curing on glass, clear varnish [1] | 25 sec | 24 sec | 46 sec | 28 sec |
| Pendulum after UV curing on glass, clear varnish [1] | 147 sec | 164 sec | 176 sec | 171 sec |
| Water resistance before UC curing on Bayfol, clear varnish [2][6] | OK | OK | OK | OK |
| Water resistance after UV curing on Bayfol, clear varnish [2][7] | 100% | 100% | 100% | 100% |
| Water resistance after UV curing Makrofol, clear varnish [3][7] | 100% | 100% | 100% | 100% |
| Ethanol resistance, 98% strength, after UV curing on Bayfol, clear varnish [2][7] | 100% | 100% | 100% | 100% |
| Ethanol resistance 98% strength, after curing on Makrofol, clear varnish [3][7] | 100% | 100% | 100% | 100% |

| Performance test | Example 8 | Example 9 | Example 10 |
|---|---|---|---|
| Pendulum hardness before UV curing on glass, clear varnish [1] | sticks | 65 sec | 15 sec |
| Pendulum hardness after UV curing on glass, clear varnish [1] | 80 sec | 195 sec | 176 sec |
| Water resistance before UV curing on Bayfol, clear varnish [2][6] | milky, soft, | severely swollen | white, soft |
| Water resistance after UV curing on Bayfol, clear varnish [2][7] | 100% | 100% | 100% |

TABLE 3-continued

| Performance testing data | | | |
|---|---|---|---|
| Water resistance after UV curing on Makrofol, clear varnish [3][7] | 100% | 100% | 80% |
| Ethanol resistance, 98% strength, after UV curing on Bayfol, clear varnish [2][7] | 60% | 80% | 80% |
| Ethanol resistance, 98% strength after UV curing on Makrofol, clear varnish [3][7] | 60% | 80% | 80% |

[6]The resistance properties are assessed after 5 minutes of exposure, by visual inspection. OK means that there are no optical changes to the film in comparison to the condition beforehand.
[7]The resistance properties are assessed after 16 hours of exposure, by visual inspection.
100%: no visible damage and no film softening
80%: slight optical alteration visible, no film softening
60%: no visible damage, but film softening
40%: slight, visible damage and film softening
20%: clearly visible damage and film softening
0%: surface destroyed The inventive examples 1-4 exhibit tack-free surfaces which resist water exposure, after drying and before curing by UV radiation. Comparative examples 8-10 are not resistant to water prior to UV curing, even when, as in the case of example 9, there is a very high pendulum hardness.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Coating systems based on radiation-curing, aqueous polyurethane dispersions comprising I) polyurethanes obtained from A) 40% to 80% by weight of a hydroxyl-containing component comprising A1) 10% to 80% by weight, based on the sum of components (A) to (F) and (II), of one or more hydroxyl-containing prepolymers selected from the group consisting of polyester (meth)acrylates or polyether (meth)acrylates having an OH number of from 5 to 300 mg KOH/g solids and comprising groups which, on exposure to high-energy radiation, undergo polymerization reaction with ethylenically unsaturated double bonds, A2) 0% to 50% by weight, based on the sum of components (A) to (F) and (II), of one or more monomeric alcohols containing (meth)acrylate groups and having an OH number of from 35 to 1000 mg KOH/g solids, B) 0.1% to 20% by weight of one or more compounds which are reactive towards isocyanate groups and contain groups which are non-ionic, ionic or capable of forming ionic groups and have a dispersing action for the polyurethane dispersion, C) 0.1% to 30% by weight of a hydroxyl- and/or amine-containing component comprising C1) 0.1% to 10% by weight, based on the sum of components (A) to (F) and (II), of hydroxyl- and/or amine-functional monomeric compounds having a functionality of 3 to 6 and a molecular weight of from 92 to 254 g/mol and/or C2) 0.1% to 20% by weight, based on the sum of components (A) to (F) and (II), of hydroxy- and/or amine-functional polyesters, C2, C3 and/or C4 polyethers and polyetheresters having a functionality of 2.3 to 4.0 and a molecular weight of from 238 to 4000 g/mol, D) 0% to 30% by weight, based on the sum of components (A) to (F) and (II), of hydroxyl-functional compounds selected from the group of monoalcohols and/or diols, each with a molecular weight in the range from 32 to 118 g/mol, polyesters, polycarbonates, C2, C3, and/or C4 polyethers, polyetheresters and polycarbonate polyesters having a functionality of 1.0 to 2.0, in each case with a molecular weight in the range from 300 to 4000 g/mol, E) 0.1% to 10% by weight, based on the sum of components (A) to (F) and (II), of monoamines, diamines and/or difunctional amino alcohols, with F) 10% to 50% by weight, based on the sum of components (A) to (F) and (II), of one or more polyisocyanates, with the proviso that the use of polyepoxy(meth)acrylates in the synthesis of (I) is excluded, and II) 0% to 40% by weight of oligo(meth)acrylates selected from the group of component (A1) with a double bond density of more than 2.0 mol of double bonds/kg of solids and, on exposure to high-energy radiation, undergoing polymerization reaction with ethylenically unsaturated compounds, the fractions of components (A) to (F) and of component (II) adding up to 100% by weight, and the mixture of (I) and (II) that is present in the coating system having a weight-average molar mass MW of 50,000 to 3,000,000 g/mol.

2. Coating systems based on radiation-curing, aqueous polyurethane dispersions according to claim 1, wherein component (C1) comprises aliphatic or cycloaliphatic triols, tetrols, hexols, triamines and/or tetraamines containing 3 to 10 carbon atoms.

3. Coating systems based on radiation-curing, aqueous polyurethane dispersions according to claim 1, wherein component (C1) comprises glycerol, trimethylolethane, trimethylolpropane, trimethylolbutane, pentaerythritol, ditrimethylolpropane, dipentaerythritol, sorbitol, glucose, fructose, diethylenetriamine and/or triethylenetetraamine.

4. Coating systems based on radiation-curing, aqueous polyurethane dispersions according to claim 1, wherein component (C2) comprises polyester alcohols selected from the group of the reaction products of adipic acid, isophthalic acid and phthalic anhydride with trimethylolpropane, glycerol, pentaerythritol, hexanediol, butanediol, diethylene glycol, monoethylene glycol or neopentyl glycol or mixtures of the stated diols.

5. Coating systems based on radiation-curing, aqueous polyurethane dispersions according to claim 4, wherein the polyester alcohols have a molecular weight of 300 to 4000 g/mol.

6. Coating systems based on radiation-curing, aqueous polyurethane dispersions according to claim 1, component (C2) comprises polyethylene glycols, polypropylene glycols and/or polytetrahydrofurans.

7. Coating systems based on radiation-curing, aqueous polyurethane dispersions according to claim 1, wherein the mixture of (I) and (II) that is present therein has a weight-average molar mass MW of 100 000 to 2 000 000 g/mol.

8. Coating systems based on radiation-curing, aqueous polyurethane dispersions according to claim 1, wherein there are at least initiator and, if desired, further auxiliaries and additives present that allow curing with high-energy radiation.

9. Process for preparing the coating systems according to claim 1, comprising the following steps:

i) reacting components A) to D) with component F) to give polyurethane prepolymers, ii) admixing component II with the reaction product of step i), and iii) dispersing the mixture obtained after step ii) in water to give an aqueous polyurethane dispersion, the (potentially) ionic groups introduced, if appropriate, with component B) being at least partly neutralized before, during or after the admixing of component II, or before, during or after the dispersing, and the polyurethane prepolymers being reacted with component E at any point in time after step i) that is possible.

10. Process according to claim 9, wherein the reaction of the remaining free isocyanate groups of the polyurethane prepolymers with component (E) takes place to an extent of 80% to 110%.

11. Process according to claim 9, wherein the difference between the NCO content at the end of step i) and the theoretically attainable NCO content is +2.0% to −1.0% by weight.

12. Adhesives or paints comprising a coating system according to claim 1.

13. Substrates coated with a paint according to claim 12.

14. Substrates according to claim 13, the substrate being selected from the group consisting of mineral underbases, wood, wood-based materials, furniture, wood block flooring, doors, window frames, metallic articles, plastics, paper, paperboard, cork, mineral substrates, textiles and leather.

15. Dual-cure-systems comprising a coating system according to claim 1.

* * * * *